Aug. 5, 1969 G. W. THOMAS 3,459,893
MULTIPLE TRUNK DIGITAL SWITCHING SYNCHRONIZATION
Filed April 25, 1966
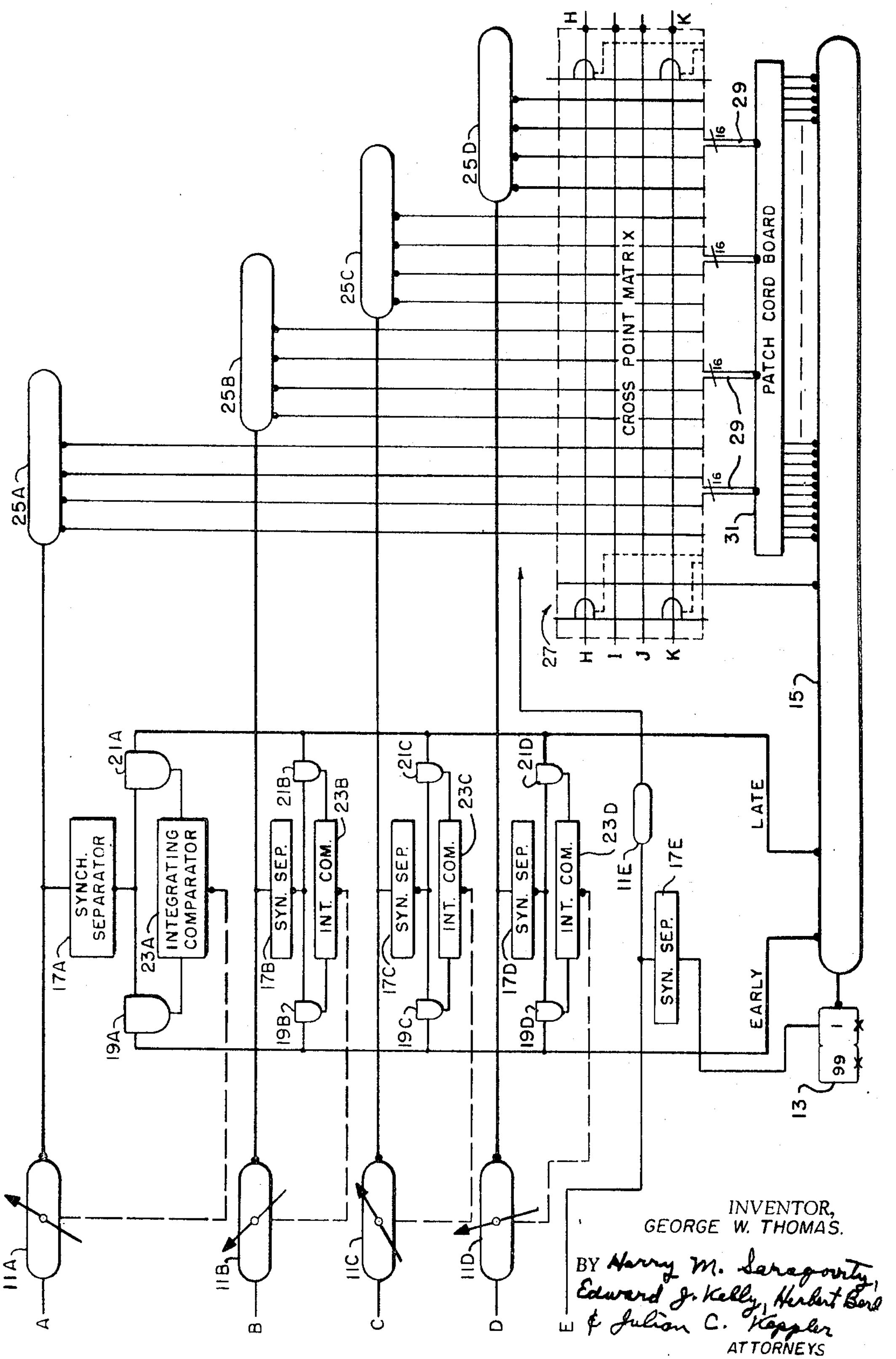
INVENTOR,
GEORGE W. THOMAS.
BY Harry M. Saragovitz, Edward J. Kelly, Herbert Berl & Julian C. Keppler
ATTORNEYS United States Patent Office 3,459,893

Patented Aug. 5, 1969

3,459,893
MULTIPLE TRUNK DIGITAL SWITCHING SYNCHRONIZATION

George W. Thomas, Keyport, N.J., assignor to the United States of America as represented by the Secretary of the Army Filed Apr. 25, 1966, Ser. No. 546,136
Int. Cl. H041 7/06
U.S. Cl. 178—69.5 2 Claims

ABSTRACT OF THE DISCLOSURE

Multiple input line signals having slightly different synch pulse frequency or phase are all re-timed to a strobe pulse generator which may be synchronized by one of the input lines. The generator produces early and late gates which are compared by means of integrating comparators with the synch pulse of each incoming line and an error signal is produced which adjusts a delay line in its line so that the output of each delay line matches the timing of the generator and that of every other line output.

This invention relates to synchronization between received signals and receiver circuits for utilizing such signals.

In many types of communication systems, such as television and teleprinters, the transmitted signal includes distinguishable synchronizing or "synch" pulses to identify the start of each full "frame" or individual line of successive TV pictures, or each individual letter to be printed. Since "noise," or even other portions of the information sent, may involve similar pulses or occasionally cancel the true synch pulses, the receiver commonly includes a timer, strobe, or clock device of rather regular period merely corrected by the incoming pulses if found consistently slow or fast. In the case of a switching center terminal involving a plurality of trunks or channels for incoming and outgoing signals, synch pulses can readily be applied to the outgoing channels without difficulty. However, the incoming signals already include their own synch pulses which may vary in original timing even when transmitted, or in propagation time through the atmosphere, and to a much lesser extent through other media. These can be switched or otherwise processed more effectively if they can all be synchronized to a similar strobe signal already available in the terminal or to any one of the other received signals. All the components required for this mode of operation are readily available. The present invention involves a time delay device capable of sufficient variation to accommodate the maximum time drift between received synch pulses and receiver strobe pulses expected to accumulate during an extended period of operation. In one form the synch portion of output from a delay device is compared to the strobe signal to determine whether early or late, and this determination is used to provide an adjustment of the delay device to provide more accurate synchronization. Alternatively the actual time difference between received synch signal and strobe signal may be determined and used to set the delay device accordingly. The overall effect is the same in either case.

The concepts of frequency and phase cannot be entirely separated. Frequency difference may be defined as the rate of change in the phase difference, or phase difference may be defined as the integral of the frequency difference. In the present case no attempt is made to provide for a continuous difference in frequency. The operation is therefore best analyzed from the standpoint of signals of uniform frequency with such minor variations as are involved in the gradual phase changes. The delays provided are only sufficient to cover a certain accumulated phase difference among the various signals.

It is the principal object of the invention to provide a simple correction of the timing of each of a plurality of received signals so that all will be in a consistent time relation for switching or other processing of the information therein. Other objects will be apparent from the following description of the accompanying drawing.

Since the invention does not lie in circuit details for which many alternatives would be suitable, but in organization of a rather simple system, it is illustrated by a logic diagram using symbols which correspond generally to MIL–STD–806–A and B, and particularly ASA–STD–Y32.14. These symbols are similar to those in an accompanying joint application of the present inventor and Theodore J. Klein, Ser. No. 546,138, filed on Apr. 25, 1966, for Signal Delay Variation Compensator. Some variations from Flores, Computer Logic, and other somewhat analogous variations are used for further simplification and clarification, eliminating word or initial legends and certain ambiguities or omissions, particularly some of the following:

(a) Output leads distinguished from inputs by "berries" if not by location on symbols;

(b) All quasi-stable circuits identified by a substantially rectangular outline showing division into two parts, and distinguished by types of input such as: X to replace non-essential astable or monostable inputs, small OR-gate-like symbol inside rectangle at continuous input as distinguished from usual transition input, direct and NOT connections from one input for threshold, etc.;

(c) Cross point switch matrices identified symbolically by a grid of signal input and output leads with rudimentary AND symbols at junctions in the four corners, to imply such AND gates at all junctions, and input control leads for each such AND gate shown merely cabled to the border of the matrix, rather than expressly showing the many crossed leads in a network of OR or AND gates shown in the usual way, in this case permitting *any* one or more input signal leads to actuate the output signal leads, as compared to more familiar AND decoding matrices in the above-mentioned joint application, in which *all* designated input leads must be used to actuate the output leads.

(d) Use of illustrative code "weight" or time values wherever helpful to analysis, even if not essential to the actual operation.

The figure illustrates the invention in one typical elementary form. Each of the several inputs is connected through a delay device 11A, B, C, D variable over a sufficient range to provide the desired correction. For the particular switching system selected for illustration the individual synch pulse signals for all channels should be jointly synchronized although sequential operation might sometimes be preferable. For this purpose the synch pulses are isolated by synch separator circuits 17A, B, C, D analogous to such circuits in television systems, but designed according to the particular characteristics of the signal. Such circuits provide output pulses only (or at least mainly) at the synch intervals. The time reference for comparison is a brief local strobe pulse represented as the output of a (very unbalanced) astable circuit 13 supplied through two taps of a delay unit 15. The first such tap provides an early pulse, and the second a late pulse, to be compared to the synch pulses from separators 17.

This is readily accomplished by AND gates 19A, B, C, D and 21A, B, C, D whose outputs are connected in opposition to integrating compensators 23A, B, C, D, each providing sustained outputs dependent on whether the particular series of synch pulses such as A is consistently early or late relative to the average time of the early and late strobe pulses. Such compensator outputs are used to adjust the settings of the corresponding delay lines 11A, B, C, D, so that all synch pulses from the separators will be simultaneous. Therefore the entire signal trains at the outputs of the delay lines 11A, B, C, D will all be synchronized.

The above adjustments may be considered as of analog nature. However, the digital type of adjustment as involved in above-mentioned joint application may also be used, involving any desired interval between digital steps. Similarly, the delay units represented as delay lines actually may be in the nature of shift registers to provide delays of large magnitude more economically.

In a typical application of the invention, pulses or pulse groups in each of the input trunks A, B, C, D are to be distributed to various output trunks designated H, I, J, K. The latter may actually be the reply portions of trunks A, B, C, D in many applications, but are here considered separately merely to minimize confusion. Since two of trunks A, B, C, D may simultaneously provide information for a single output trunk as H, some form of storage is required, illustrated as tapped delay lines 25A, B, C, D, although shift register storage would again be suitable. The delay line 25 outputs may be applied to the trunks H, I, J, K through a cross point switch matrix 27, having many input control leads, one for each intersection on the matrix, shown in cables 29 from the outputs of patch cord board 31. An additional input to the matrix from delay unit 15 has control leads operated continuously, or at least during synch pulse from delay unit 15, to provide synch pulse outputs to all of the trunks H, I, J, K.

The inputs to board 21 are provided by a series of clocking outputs from delay unit 15. This board may be manually connected by jumper wires, so that each incoming trunk is connected in any available turn to an outgoing trunk, with such delays as may be incidental to the time sharing. The connection of these jumper wires is extremely confusing but readily accomplished by a methodical analysis of the various overlapping time relations. In actual operation the board 31 would be electronic to permit rapid change of switching whenever an incoming message includes switching instructions to send a further message to a different destination. As this is not involved in the invention itself, it is not here analyzed in detail.

An additional input E is shown in slightly different form to illustrate that the strobe signal may be regulated by one of the received signals, normally the one considered most reliable. This can slightly modify the internal timing of astable circuit 13. In this case the delay 11E need not be variable but merely of the proper value so that the output synch pulses of all the signals would be simultaneous. The output of this circuit would be processed the same as the others but has not been shown in detail.

By making the time comparison at the output of the delay line only the residual error component need be analyzed. Thus operation is more exact than when the entire time difference must be determined.

Many of the components of such a switching system are used infrequently but are necessary to provide for the wide range of possibilities which are likely to arise in operation. To avoid prohibitive cost some possibility of failure due to overload must always be tolerated in any system involving sharing of facilities. In general, each trunk would have messages for several other trunks, and some trunks would be almost fully loaded, others lightly loaded. The switching normally can provide for any combination within the capabilities of the trunks; the sharing of capabilities provides the most efficient and economical usage under most conditions.

One typical application of the invention has been illustrated. Many others will be readily apparent to those skilled in the art.

What is claimed is:

1. In a communication center for processing a plurality of statistically similar incoming pulse train signals on separate lines, each including synchronizing pulses, each of said signals having similar periods but subject to variations in phase because of differences in origin or communication paths, means for synchronizing all of said incoming pulse train signals comprising; a generator for producing a reference strobe pulse of the desired period, automatically variable time delay line means connected in series with each of said separate lines, a synch separator connected to the output side of each of said delay lines, two AND gates connected to the output of each of said synch separators, a delay line with a pair of fixed taps connected to the output of said generator for producing early and late gates, means to connect said early gate to the other input of one of said two AND gates and means to connect said late gate to the other of said two AND gates, the outputs of each pair of AND gates being connected in opposite polarity to an integrating comparator which produces an error signal dependent on the timing of the synch pulses of each line relative to said early and late gates, the output of each of said comparators being connected to the variable delay line associated with its line, thereby automatically controlling the delay thereof.

2. The circuit of claim 1 wherein said generator is triggered or synchronized with the synch pulses of one of said incoming lines.

References Cited

UNITED STATES PATENTS

| | | | |
|---|---|---|---|
| 2,074,307 | 3/1955 | Gillette et al. | |
| 2,752,424 | 6/1956 | Pugsley. | |
| 3,202,769 | 8/1965 | Coleman. | |
| 3,141,926 | 7/1964 | Newell | 178—5.4 |

RICHARD MURRAY, Primary Examiner

ALFRED H. EDDLEMAN, Assistant Examiner